United States Patent [19]
Huber

[11] 3,870,172
[45] Mar. 11, 1975

[54] FRAME STRUCTURE FOR LOADER
[76] Inventor: Mortimer J. Huber, 5901 W. Bald Eagle Blvd., St. Paul, Minn. 55110
[22] Filed: May 15, 1972
[21] Appl. No.: 252,997

[52] U.S. Cl. .............................. 214/140, 180/66 R
[51] Int. Cl. ............................................. B66f 9/00
[58] Field of Search......... 214/140, 770; 280/106 R; 180/66 R

[56] References Cited
UNITED STATES PATENTS

| | | | |
|---|---|---|---|
| 3,067,887 | 12/1962 | Quayle............................ | 214/770 X |
| 3,070,244 | 12/1962 | Lull.................................. | 214/770 |
| 3,328,049 | 6/1967 | Luterbach....................... | 280/106 R |
| 3,465,839 | 9/1969 | Pensa.............................. | 214/140 X |
| 3,552,765 | 1/1971 | Ostwald.......................... | 303/2 X |
| 3,656,642 | 8/1972 | Kostas............................. | 214/140 |

*Primary Examiner*—Frank E. Werner
*Attorney, Agent, or Firm*—Dressler, Goldsmith, Clement & Gordon, Ltd.

[57] ABSTRACT
A material handling implement is disclosed in this application. The material handling implement includes a body that defines an engine space at one end and a forward space at the opposite end with a pair of stanchions projecting upwardly at the rear of the body. Loader arms are pivotally mounted at the upper ends of the respective stanchions and project forwardly and downwardly at the opposite sides of the engine and forward spaces with a material handling member mounted on the front end of the arms.

The body consists of a rigid one piece plate that is bent at spaced locations to define the bottom wall and side walls for the engine and forward spaces as well as outwardly directed flanges at the upper ends of the respective side walls. The body is reinforced adjacent the forward and rear ends and the reinforcement at the rear end defines a fuel tank.

Each stanchion defines a compartment and the upper ends of the compartments are interconnected by a hollow cross member to define a hydraulic fluid compartment. The lower ends of the respective stanchions have openings that define an inlet and an outlet for hydraulic fluid that is utilized for operating hydraulic means that cooperate with the lift arms and the material handling member.

13 Claims, 7 Drawing Figures

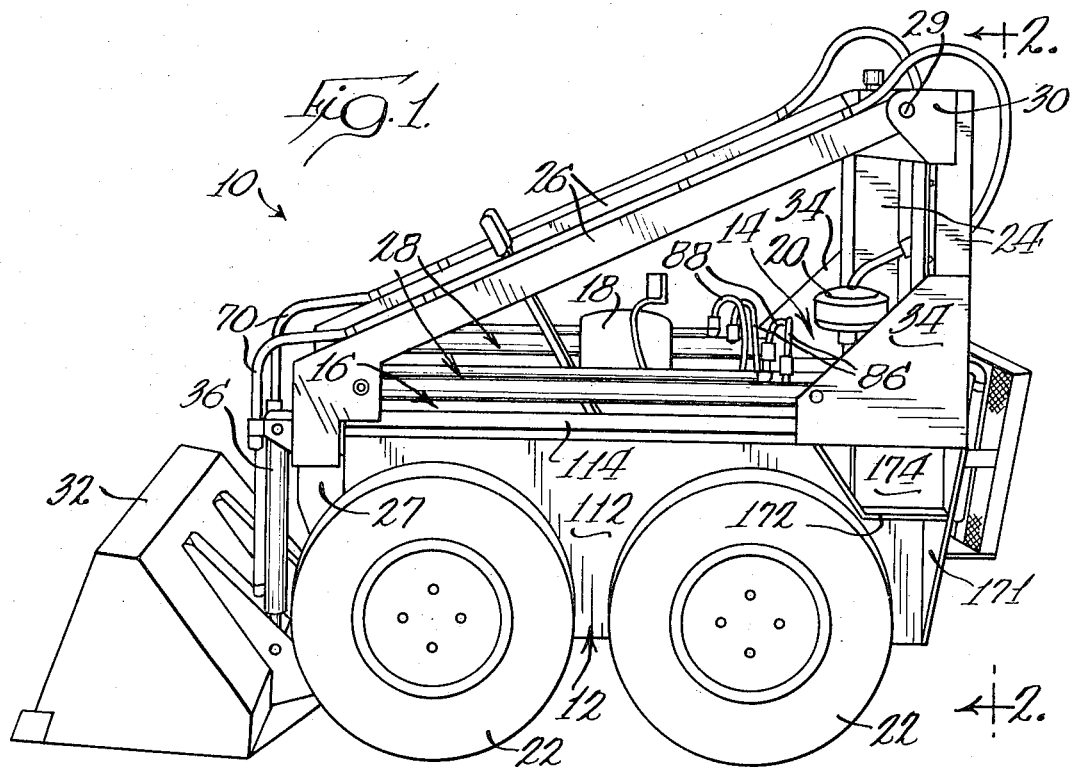

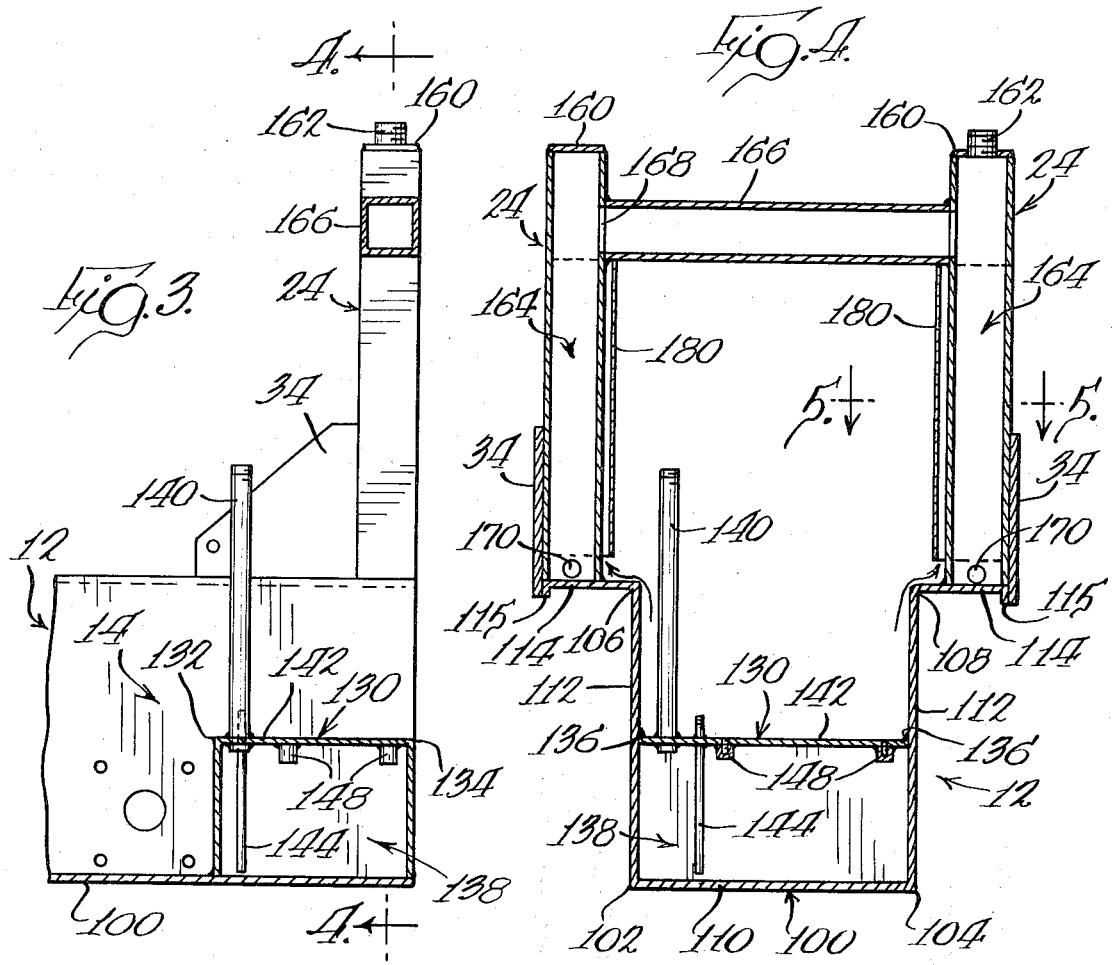
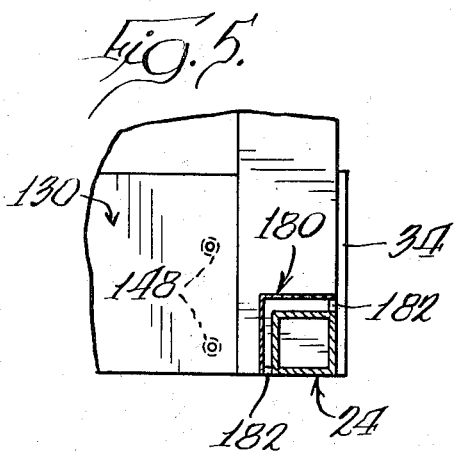
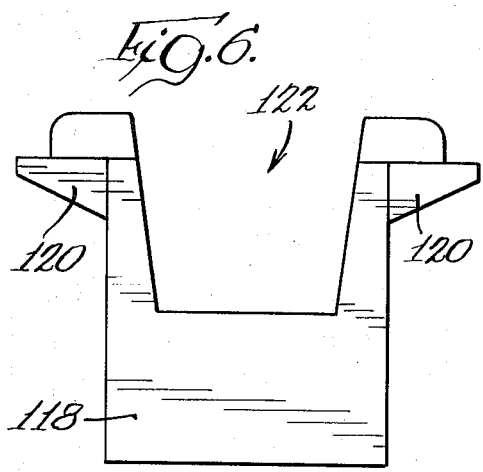

FRAME STRUCTURE FOR LOADER

BACKGROUND OF THE INVENTION

The present invention relates to the art of vehicles of the tractor type and is particularly concerned with vehicles that accommodate various attachments for handling material, such as front end loaders, dozer blades, fork lifts, etc.

The use of self-propelled vehicles for handling material has been known for many years. In many instances, limited space requirements in areas such as warehouses, makes it mandatory that the vehicle or unit be compact, highly maneuverable and light weight. Units of the general character to which this invention is related are shown in Melroe et al. U.S. Pat. No. 3,231,117 and Olsen et al. U.S. Pat. No. 3,279,637.

As will be appreciated, the size and weight for the various components that form the frame structure for a vehicle of this type considerably increase the overall weight and size of the unit. Thus, any reduction in the number and weight of the various frame components can appreciably reduce the overall size and weight of the unit.

SUMMARY OF THE INVENTION

The present invention contemplates a frame structure for a tractor vehicle that is to be used in handling material and in which the frame structure is formed of readily available metal pieces that can be interconnected by welding to produce a rigid frame.

The tractor vehicle includes a vehicle body having an engine space at the rear end and a forward space for the operator's legs at the forward end with a seat for the operator mounted on the body intermediate the engine space and forward space.

The body consists of a single rigid one piece plate that is bent at spaced locations between opposed edges to define a bottom wall and side walls for the engine and forward spaces with an outwardly directed flange at the upper end of each of the side walls. The body is reinforced in the engine space by a U-shaped member connected to the bottom and side walls of the plate. The U-shaped member cooperates with the rigid plate to define a fuel tank in the engine space. The fuel tank has mounting means on the top wall thereof and an engine is secured to the mounting means.

The forward end of the vehicle body has a unitary piece which is secured to the bottom and side walls, as by welding, to rigidify the forward end of the body. In addition, gusset plates are secured to the one piece plate at various locations, particularly between the flanges and the side walls of the body to further rigidify the frame structure.

According to another aspect of the invention, the frame structure further includes a stanchion projecting upwardly from each of the flanges adjacent the engine space with a lift arm pivotally connected to each stanchion. Each lift arm extends forwardly along the associated flange and downwardly adjacent the forward end of the body and a material handling member is mounted on the forward ends of the arms. The arms are adapted to be raised and lowered by hydraulic means located between the arms and the frame while the material handling member may be moved relative to the lift arms with further hydraulic means.

According to another aspect of the invention, the stanchions are designed to provide a compartment for hydraulic fluid. For this purpose, each stanchion is a hollow member, preferably rectangular in cross-section, with the lower end rigidly secured to the upper surface of the flange. A hollow cross member interconnects the compartments adjacent the upper ends of the stanchions while the lower ends of the stanchions each having an opening therein. The respective openings define an inlet and an outlet for fluid being stored within the hollow compartments and the hollow cross member. Thus, the fluid that is utilized in operating the hydraulic means, which may also include a hydrostatic drive means, is withdrawn from one of the upright stanchions and returns to the other upright stanchion. This requires that the fluid be continuously recirculated within the compartments defining the fluid chamber.

According to a still further aspect of the invention, each upright stanchion has means surrounding at least a portion of the stanchion and cooperating therewith to produce a flow path for a cooling fluid. In the specific embodiment illustrated, this means consists of a shield that surrounds the forward and inside walls of the fluid compartments, defined by the stanchion, with each shield being spaced from its associated stanchion to provide the flow path. The shield performs the dual function of providing a flow path for a cooling fluid along the outer surface of the stanchion and also provides an outer shield spaced from the fluid compartment so that the operator cannot directly become engaged with the fluid compartment surface during the operation of the vehicle. In compact units of the type described above, this feature is of considerable importance because the operator is in close proximity to the fluid compartment.

All of the components described above that form the frame structure for a material handling implement, such as a loader, can be formed of stock parts which need not be machined to close tolerance, thereby considerably reducing the cost of the frame structure. Furthermore, the arrangement and relationship of the various parts that form the frame structure reduces the number of parts making up the frame thereby considerably reducing the overall weight of the frame structure.

BRIEF DESCRIPTION OF SEVERAL VIEWS OF DRAWINGS

FIG. 1 is a perspective view of a vehicle having the present invention incorporated therein;

FIG. 2 is a rear end view of the vehicle as viewed along line 2—2 of FIG. 1;

FIG. 3 is a transverse fragmentary sectional view taken generally along line 3—3 of FIG. 2 showing only the frame structure of the vehicle with several components associated therewith being deleted;

FIG. 4 is a vertical section taken generally along lines 4—4 of FIG. 3;

FIG. 5 is a transverse section taken generally along 5—5 of FIG. 4;

FIG. 6 is a front end view of the frame structure; and

DETAILED DESCRIPTION

Figure 7:
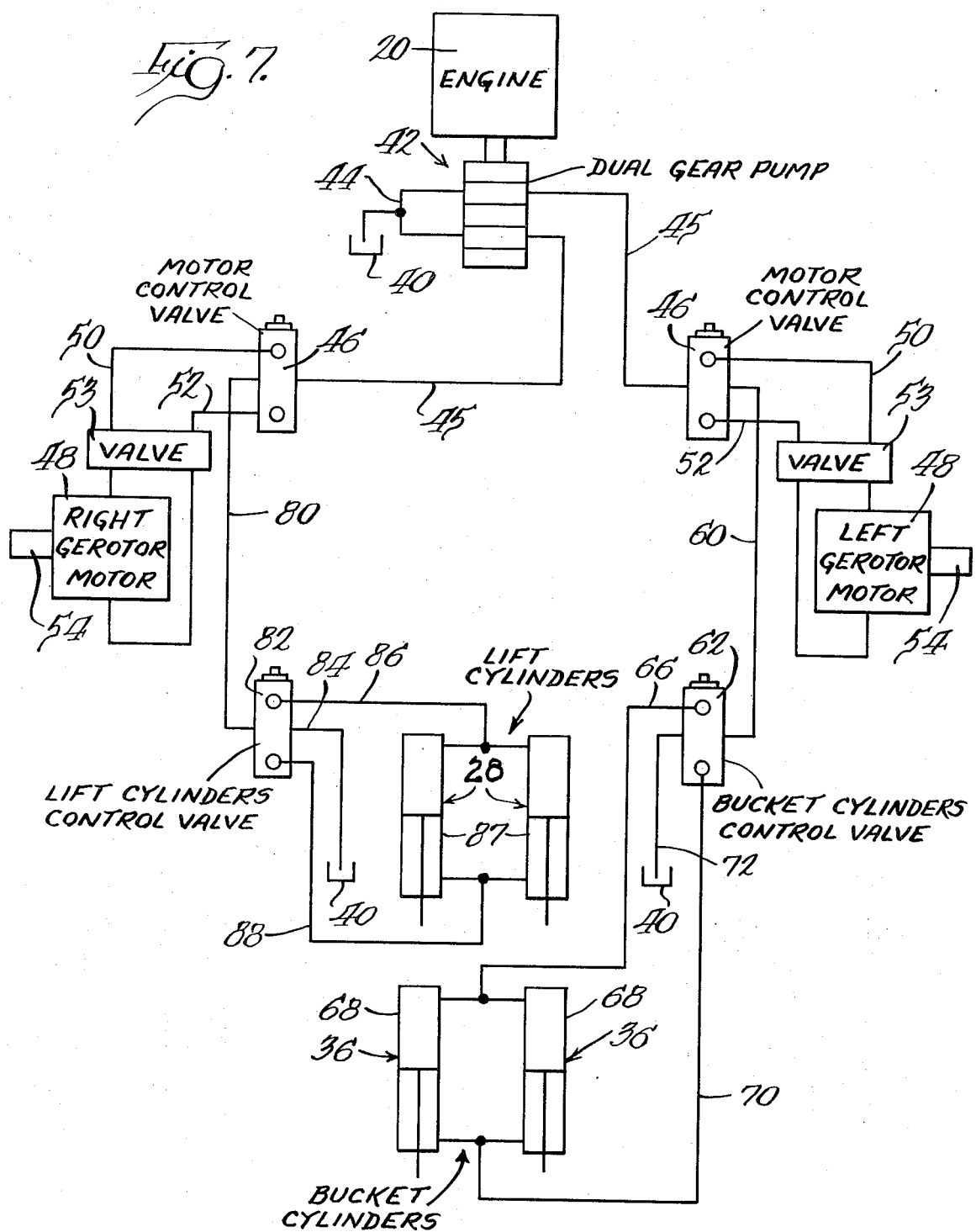
FIG. 7 is a schematic illustration of the hydraulic circuit that is incorporated into the vehicle.

While this invention is susceptible of embodiment of many different forms, there is shown in the drawings and will herein be described in detail one specific embodiment, with the understanding that the present disclosure is to be considered as an exemplification of the principles of the invention and is not intended to limit the invention to the embodiment illustrated.

FIG. 1 of the drawings shows a tractor vehicle, generally designated by the reference numeral 10. Tractor vehicle 10 consists of a frame structure including body 12 defining engine space 14 at the rear end thereof and forward space 16 for the operator's legs at the forward end thereof. Seat 18 is located intermediate the engine space and the forward space and extends above body 12. Engine 20 (FIG. 2) is located in engine space 14 at the rear end of body 12, while body 12 is supported on first and second pair of ground engaging members or wheels 22 that have stub shafts 23 rotatably supported on body 12. One pair of wheels is located on each side of body 12.

Tractor vehicle 10 further includes first and second stanchions 24 extending above body 12 adjacent the rear end thereof on opposite sides of engine space 14. Upright stanchions 24 define a further portion of the frame structure that includes body 12, as will be explained later. Lift arm 26 is pivotally mounted by pivot pin 28 adjacent the upper end of each stanchion 24. Pin 28 may be supported on forwardly extending brackets 30, (only one being shown).

Lift arms 26 extend forwardly along opposite sides of spaces 14 and 16 as well as seat 18 and have front portions 27 directed downwardly adjacent the front end of body 12. Material handling member 30, illustrated as a bucket, is pivotally connected to the forward ends of lift arms 26 through pins (not shown). Materially handling 30 may take a variety of forms such as a dozer blade, scoop, fork lift, etc.

Lift arms 26 may be raised and lowered by fluid rams 28 each having one end pivotally connected to inner and outer gusset plates, only outer plate 34 being shown, rigidly secured to upright stanchion 24 and body 12. Likewise, material handling member may be pivoted on the forward ends of lift arms 26 through fluid rams 36 (only one being shown in FIG. 1).

Since the frame structure of the present invention is preferably utilized in connection with an all hydraulic unit which incorporated hydrostatic drive means the remainder of the hydraulic control system will now be described to provide a complete environment for the invention.

The hydraulic control system is shown in FIG. 7 and includes reservoir 40 connected to dual gear pump means 42 through conduits 44. The dual gear pump means has first and second output conduits 45 that are respectively connected to inlet ports of control valves 46. Each control valve is connected to fluid motor means 48 through conduits 50 and 52, which have relief valve means 53 incorporated therein.

The respective motors each have output shaft 54 connected to a pair of wheels 22 with the connection being made through suitable chain engaging sprockets on shaft 54 and stub shafts 23. The details of the drive have been discussed for supplying a complete environment for the present invention.

Relief valve means 53 are specifically disclosed and claimed any my copending application Ser. No. 291,736, filed Sept. 26, 1972, now abandoned, and assigned to the assignee of the present invention. Since the details of the relief valve means or time delay devices do not form a part of the present invention, no detailed description thereof appears to be necessary.

One conduit means 45 also supplies fluid under pressure to the material handling member rams 36 while the other conduit means supplies fluid to lift rams 28. For this purpose, one control valve means 46 supplies fluid under pressure from conduit 45 to conduit 60 through valve 46 when it is in a neutral position. Conduit 60 is connected to the inlet port of bucket control valve means 62.

One outlet port of bucket valve 62 is connected through conduit 66 to the head ends of cylinders 68 forming part of fluid rams 36. The other outlet port of control valve 62 is connected through conduit 70 to the rod ends of cylinders 36. A further port of control valve 62 is connected through conduit 72 to reservoir 40. With both valves 46 and 62 in a neutral position, the fluid delivered through conduit means 45 is returned directly to reservoir 40 through conduits 60 and 72. The fluid may be supplied to either end of cylinders 68 by actuation of control valve 62 in opposite directions from the neutral position. Likewise, control valve 46 can be actuated in opposite directions from the neutral position to rotate the output shaft of motor 48 in either direction and provide forward or reverse driving motion for one pair of wheels on one side of the vehicle body 12.

Control valve 46, cooperating with the other fluid motor, may be actuated in opposite directions from a neutral position to rotate output shaft 54 of motor 48 in opposite directions to provide forward and reverse drives for the other pair of wheels 22. Again, in the neutral position for second control valve 46, fluid under pressure delivered from conduit means 45 passes through the valve 46 and conduit 80 to lift control valve means 82.

Lift control valve means 82 is adapted to supply fluid to opposite ends of fluid rams 28 to extend and retract the rams thereby raising and lowering the lift arms. However, in the neutral position, for valve means 82 all of the fluid received from conduit means 45 is returned to reservoir 40 through a further conduit 84.

One outlet port of control valve means 82 is connected by conduit 86 to one end of fluid cylinders 87 forming part of hydraulic frame 28, while another outlet port is connected through conduit 88 to the opposite ends of cylinders 87. Thus, actuation of the control valve in either direction from the neutral position will place conduit 80 in communication with one end of cylinders 87 while the placing of the opposite ends of cylinders 87 in communication with reservoir 40.

By utilizing the completely hydraulic control system and drive system described above, substantial weight for the drive components, such as the transmission and differential can be eliminated.

According to the present invention, the entire frame structure including body 12 and stanchions 24 is produced in such a manner to result in an extremely rigid structure that is inexpensive to manufacture since all of the components are stock items. Such an arrangement considerably reduces the amount of machining required for producing the frame structure. All of the pieces that form the frame structure are preferably formed of metal that can be readily secured to each other, as by welding.

According to the present invention, body 12 consists of a rigid one piece metal plate 100 (FIG. 4) that is bent at spaced locations to define a bottom wall and side walls for spaces 14 and 16 and also to define a support for upright stanchions 24. As most clearly shown in FIG. 4, plate 100 is bent at spaced parallel bend lines 102, 104, 106 and 108. By bending the rigid one piece plate 100 at the spaced parallel lines and producing bends of approximately 90°, plate 100 defines bottom wall 110 and opposite side walls 112 for engine space 14 as well as forward space 16. The areas of the plate extending beyond bend lines 106 and 108 define outwardly directed flanges 114 adjacent the upper ends of side walls 112. The flanges may be bent at further parallel locations to produce downwardly directed lips 115.

The forward end of body 12 is rigidified by front end wall 118 that is preferably welded to the forward edge of bottom wall 110 and side walls 112. In addition, the forward ends of flanges 114 are rigidified by gusset plates 120 welded to outwardly directed flanges 114 (not shown in FIG. 6) and to the outer edges of the front end plate 118. Opening 122, provided in front end plate 118, is to allow circulation of air to the operator's feet located in the forward compartment 16. This area may be enclosed by an open mesh screen.

According to another aspect of the invention, the rear end of the body 12 is also rigidified by suitable plates that perform an additional function of producing a fuel compartment for engine 20. The rigidified structure for the rear end of body 12 is most clearly shown in FIGS. 3 and 4. This rigidifying structure includes a U-shaped member 130 that again is a rigid one piece plate which is bent along spaced parallel bend lines 132 and 134 to produce a base and a pair of legs extending from the base. The length of plate 130 is equal to the spacing between side walls 112 so that opposite ends of plate 130 can be secured to side walls 112 by welds 136. Thus, bottom wall 110 and portions of side walls 112 cooperate with U-shaped member 130 to define a fuel compartment, generally designated by the reference numeral 138. Fuel compartment 138 has filler line or conduit 140 extending through top wall 142 and terminating at a readily excessible space above body 12. In addition tube 144 extends through an opening in top wall 142 of fuel compartment 138 and terminates a close proximity to bottom wall 110. Fuel line 144 is connected through flexible conduit 146 to engine 20 to supply fuel thereto.

As will be appreciated from the above description, the U-shaped member cooperating with rigid plate 100 performs the dual function of providing a fuel compartment and rigidifying the body adjacent the rear end of the frame structure.

According to another aspect of the invention, the U-shaped member that cooperates with rigid plate 100 to define the fuel compartment or tank 138 performs an additional function of providing a rigid support for engine 20. For this purpose, top wall 142 of fuel tank 138 has a plurality of engine mounts or mounting means 148 rigidly secured to the inner surface thereof, as by welding. Engine 20 sets on top of top wall 142 for fuel compartment 138 and is held in fixed position by a screw 149 extending through openings (not shown) and threaded into threaded openings in mounting means 148 and in the top wall of fuel compartment 148.

According to another aspect of the invention, the upright stanchions not only provide the pivotal support for lift arms 26, but also define reservoir 40 for the hydraulic fluid that is utilized to operate the hydraulic control system shown in FIG. 7 and produce part of the reinforcing means for the rear end of body 20. For this purpose, stanchions 24 are hollow members, preferably rectangular in cross-section, as shown in FIG. 5. The lower end of each rectangular hollow member is fixedly secured, as by welding, to the upper surface of an outwardly directed flange 114. The upper ends of the respective hollow members that define the two upright stanchions are sealed at the top by plate 160, which is preferably welded thereto. One of the plates 160 has a short filler tube 162 extending through an opening and welded therein, to provide filler means for receiving hydraulic fluid.

The respective compartments 164 that are defined in upright stanchions 24 are interconnected by hollow cross member 166 that extends across the upper ends of stanchions 24 and is welded thereto. Hollow cross member communicates with the respective compartments through openings 168. Each stanchion 24 also has opening 170 defined on the lower end thereof. One of the openings 170 defines an inlet while the other opening defines an outlet for fluid that is being utilized in the various operations. Thus, conduit 44 (FIG. 7) could be attached to one opening 170 in one of the stanchions while the two conduits 72 and 84 would be attached to the other opening 170 so that fluid would be withdrawn from one of the stanchions and would be returned to the other stanchion. This arrangement insures that the fluid in reservoir 40, that is defined by compartments 164 and cross member 166 is recirculated since the return fluid must enter one upright stanchion and reach the level of cross member 166 to return to outlet conduit 44 before it can be withdrawn through opening 170. This coupled with the fact that the compartments have a large amount of exposed surface area, aids in keeping the fluid from becoming overheated.

The hollow cross member also substantially rigidifies the frame structure particularly adjacent the engine compartment for the vehicle. Furthermore, since the cross member is located adjacent the upper ends of stanchions 24, it further provides a rigid interconnection between the upright stanchions.

The respective stanchions are further rigidified by the side plates 34 that define part of the pivotal connection for fluid rams 28, since the side plates are welded to the stanchions as well as to downwardly directed lip 115 at outer ends of each flange 114. In addition, each flange is further rigidified by gusset plates. Gusset plate 171 is welded to the outside surface of side wall 112 and the bottom surface of flange 114. The area below each upright is preferably further rigidified by an angle gusset plate 172 (FIG. 1) that is welded to the forward surface of gusset plate 171 and to the other surface of side wall 112 as well as to the bottom surface of flange 114. A further plate 174 may also be welded to the upper surface of gusset plate 172 and the lower surface of flange 114 in the area below each stanchion 24.

According to another aspect of the invention, the uprights or stanchions further include means surrounding at least a portion of each stanchion and cooperating therewith to produce a flow path for a cooling fluid to further insure that fluid in compartments 164 and cross member 166 is maintained at the desired temperature. This means is more clearly shown in FIGS. 4 and 5 and consists of a shield 180 that is substantially L-shaped in cross sectional configuration and extends along the forward wall and the inside wall of each of the hollow members that define the respective upright stanchions 24. Each shield is spaced from the outer surface of the associated stanchion by suitable spacers 182 that may be welded to the shield and hollow member. The shields extend substantially the entire length of the stanchion and provide a flow path for a cooling fluid along the outer surface of the stanchion as indicated by the arrows in FIG. 4.

It should be noted that the cooling fluid is readily available from the engine because of the relative location of the engine space and the stanchions. As shown in FIG. 2, the engine 20 normally has a driven fan 190 that develops cooling fluid for the engine. This cooling fluid is directed outwardly and upwardly from the engine and flows along the path defined by the outer peripheral surface of the stanchions and the inner surface of the shields.

The shields provide an additional advantage in that the spacing of the shield from the outer surface of the stanchion prevents the operator, who is seated in close proximity to the stanchion, from directly engaging the peripheral surface of the upright.

As can be seen from the above description, the frame structure of the present invention provides a simple and inexpensive rigid unit that can readily be manufactured without the use of any special tools other than welding equipment. The entire device is built without the use of any bolts which could become loosened and reduce the rigidity of the device. Because of the interrelationship of the various parts, relatively lightweight materials can be used to build the frame structure without sacrificing structural strength in the finished unit.

I claim:

1. A tractor vehicle for use in handling material comprising: a vehicle body having an engine space at the rear end thereof and a forward space for the operator's leg with a seat for the operator mounted on said body intermediate said engine space and forward space, said body including a rigid plate bent at spaced locations to define a bottom wall and side walls for said spaces with an outwardly directed flange at the upper end of each of said side walls; an engine mounted in said engine space; ground engaging members rotatably supported on each of said side walls; drive means connecting said engine to said ground engaging members; a stanchion projecting upwardly from each of said flanges adjacent the engine space; a lifting arm pivotally connected to each stanchion with each arm extending forwardly along the associated flange and downwardly adjacent the front end of said body; a material handling member mounted on the forward end of said arms; and means cooperating with said arms to raise said arms and the material handling member mounted thereon.

2. A vehicle as defined in claim 1, in which each upright stanchion defines a compartment, further including a hollow cross member interconnecting said compartments in said stanchions.

3. A vehicle as defined in claim 2, further including a shield surrounding at least a portion of each of said stanchions, each shield being spaced from its associated stanchion to provide a flow path for a cooling fluid along the outer surface of each stanchion.

4. A vehicle as defined in claim 2, further including means surrounding at least a portion of each stanchion and cooperating therewith to produce a flow path for a cooling fluid.

5. A vehicle as defined in claim 1, in which each upright stanchion defines a fluid compartment, further including means surrounding at least a portion of each stanchion and cooperating therewith to produce a flow path for a cooling fluid.

6. A vehicle as defined in claim 1, further including a U-shaped member in said engine space, said U-shaped member cooperating with said bottom wall and side walls to define a fuel tank.

7. A vehicle as defined in claim 6, in which said U-shaped member defines a top wall for said tank, further including engine mounting means carried by said top wall with said engine secured to said mounting means.

8. A tractor vehicle for use in a material handling implement comprising a vehicle body having an engine space at one end and a forward space for the vehicle operator's legs at the opposite end with an operator's seat intermediate said ends; hollow stanchions projecting upwardly from said body adjacent the engine space, each stanchion defining a compartment for hydraulic fluid; a hollow rigid cross member interconnecting said compartment in said stanchions; filler means adapted to receive hydraulic fluid to fill said compartments; means defining an inlet adjacent the lower end of one stanchion and an outlet adjacent the lower end of the other stanchion; a lifting arm pivotally mounted on the upper end of each stanchion; each arm extending forwardly along opposite sides of said operator's seat and said forward space and downwardly adjacent the front end of said body; a material handling member mounted on the forward end of said arms; and first hydraulic means cooperating with said arms to raise and lower said arms; second hydraulic cooperating with said material handling member; and conduit means connecting said hydraulic means to said inlet and outlet on said stanchions.

9. A vehicle as defined in claim 8, further including a shield surrounding at least a portion of each stanchion, each shield being spaced from its associated stanchion to provide a flow path for a cooling fluid along the outer surface of the stanchion.

10. A vehicle as defined in claim 9, in which each stanchion is rectangular in cross section to define a front wall, rear wall, inside wall and outside wall and in which each shield is located adjacent the inside and front walls of its associated stanchion.

11. A vehicle as defined in claim 8, in which said body includes a rigid plate bent at spaced locations to define a bottom wall and side walls for said engine space and forward space with an outwardly directed flange at the upper end of said side walls, said stanchions being secured to said flanges adjacent said engine space.

12. A vehicle as defined in claim 11, further including a U-shaped member in said engine space, said U-shaped member cooperating with said bottom and side walls to define a fuel compartment in said engine space, said U-shaped member defining a top wall for said fuel compartment; engine mounting means on said top wall and an engine secured to said mounting means.

13. A vehicle as defined in claim 12, further including means surrounding at least a portion of each stanchion and cooperating therewith to produce a flow path for a cooling fluid.

* * * * *